(12) United States Patent
Nakano

(10) Patent No.: US 7,425,784 B2
(45) Date of Patent: Sep. 16, 2008

(54) ALTERNATOR HAVING DRIVING PULLEY WITH END FLANGES

(75) Inventor: Kazutoshi Nakano, Kariya (JP)

(73) Assignee: Denso Corporation, Kariya (JP)

( * ) Notice: Subject to any disclaimer, the term of this patent is extended or adjusted under 35 U.S.C. 154(b) by 516 days.

(21) Appl. No.: 11/212,621

(22) Filed: Aug. 29, 2005

(65) Prior Publication Data
US 2006/0097591 A1 May 11, 2006

(30) Foreign Application Priority Data
Nov. 11, 2004 (JP) ............... 2004-327599

(51) Int. Cl.
H02K 5/04 (2006.01)
H02K 5/10 (2006.01)

(52) U.S. Cl. .............. 310/89; 474/70; 474/170
(58) Field of Classification Search ............ 310/89; 474/70, 170
See application file for complete search history.

(56) References Cited

U.S. PATENT DOCUMENTS 6,351,046 B1 * 2/2002 Bradfield .............. 310/90
6,676,548 B2 * 1/2004 Fujiwara .............. 474/70
2005/0119077 A1 * 6/2005 Faucon et al. ............ 474/70

FOREIGN PATENT DOCUMENTS

| DE | 10125705 A1 | * 11/2002 |
| DE | WO 03081063 A2 | * 10/2003 |
| JP | B2 3509292 | 1/2004 |

* cited by examiner

Primary Examiner—Karl Tamai
Assistant Examiner—David W. Scheuermann
(74) Attorney, Agent, or Firm—Oliff & Berridge, PLC

(57) ABSTRACT

An alternator for use in an automobile is driven by an internal combustion engine. The alternator includes a pulley that is coupled to a rotating shaft of the engine via a driving belt such as a poly-V belt. Plural pulley grooves to be engaged with the driving belt are formed on the pulley between a front flange and a rear flange. A projected surface of a front frame is located around the outer periphery of the rear flange, so that the driving belt is correctly positioned between the front and the rear flanges, guided by the projected surface. Two overlaps in the axial direction between the pulley and the front frame are formed to reduce an amount of water entering into the alternator through a gap between the pulley and the front frame.

7 Claims, 3 Drawing Sheets

FRONT SIDE ← → REAE SIDE

FRONT SIDE      REAE SIDE

ALTERNATOR HAVING DRIVING PULLEY WITH END FLANGES

CROSS-REFERENCE TO RELATED APPLICATION

This application is based upon and claims benefit of priority of Japanese Patent Application No. 2004-327599 filed on Nov. 11, 2004, the content of which is incorporated herein by reference.

BACKGROUND OF THE INVENTION

1. Field of the Invention

The present invention relates to an alternator for use in an automotive vehicle, and more particularly to such an alternator having a driving pulley with end flanges.

2. Description of Related Art

Generally, an alternator for use in an automobile is driven by an engine via a driving belt coupled to a pulley of the alternator. When a so-called poly-V belt having plural V-shaped projections is used as the driving belt, the poly-V belt has to be correctly positioned relative to plural pulley grooves formed on the pulley. That is, the plural V-shaped projections of the driving belt have to be engaged with the plural pulley grooves, so that the V-belt is correctly positioned in the axial direction within a width of the pulley. For this purpose, a pulley having end flanges formed at both axial ends of the pulley is proposed, as exemplified in JP-B2-3509292.

It is not easy, however, to make end flanges having a relatively large diameter, especially when the pulley is made of a steel plate by stamping. If the diameter of the flanges is not sufficiently large, the poly-V belt may not be correctly positioned relative to an axial width of the pulley. Further, water may enter into a bearing of the alternator through an axial gap between the pulley and an axial end of a bearing holder. The bearing may be damaged with the water, and thereby noises may be generated and a life of the alternator may be shortened.

SUMMARY OF THE INVENTION

The present invention has been made in view of the above-mentioned problem, and an object of the present invention is to provide an improved alternator having a pulley with end flanges, wherein a poly-V belt is correctly positioned around the pulley and an amount of water entering into the alternator is reduced.

The alternator includes a frame composed of a front frame and a rear frame, a stator fixedly contained in the frame, a rotor rotatably supported in the frame inside the stator and a pulley connected to the rotor at an front side of the frame. A rotating shaft of an engine and the pulley are coupled by a driving belt (such as a poly-V belt) to drive the alternator by the engine. The pulley has a cylindrical shape and includes plural pulley grooves to be engaged with projections formed on an inner surface of the driving belt, a first flange formed at an front end of the pulley and a second flange formed at a rear end of the pulley. The diameter of the second flange is made larger than the outer diameter of the pulley grooves and smaller than the diameter of the first flange. A projected portion is circularly formed on a front end of the frame so that the projected portion is positioned at a radial outside of the second flange. Windows for sucking cooling air into the frame are formed at a radial outside of the projected portion.

A gap L1 between the inner diameter of the projected portion and the diameter of the second flange is made smaller than a thickness (in the radial direction) of the driving belt. A front end surface of the projected portion is positioned at a front side of a rear end of the second flange, thereby making an overlap L2 therebetween. A front end surface of the projected portion is positioned at a front side of a rear end surface of the pulley, thereby making another overlap L3 therebetween.

Since the gap L1 is smaller than the thickness of the driving belt, and since the front end surface of the projected portion is positioned in a front side of the rear end of the second flange, the driving belt can be correctly positioned between two flanges, guided by the front end surface of the projected portion even if the diameter of the second flange is not sufficiently large. Since there are two overlaps L2 and L3 between the front frame and the pulley, an amount of water entering into a bearing in the front frame is reduced. Since the cooling air sucking windows are formed radially outside of the projected portion, cooling air smoothly flows into the frame.

Other objects and features of the present invention will become more readily apparent from a better understanding of the preferred embodiment described below with reference to the following drawings.

DETAILED DESCRIPTION OF THE PREFERRED EMBODIMENT

Figure 1:
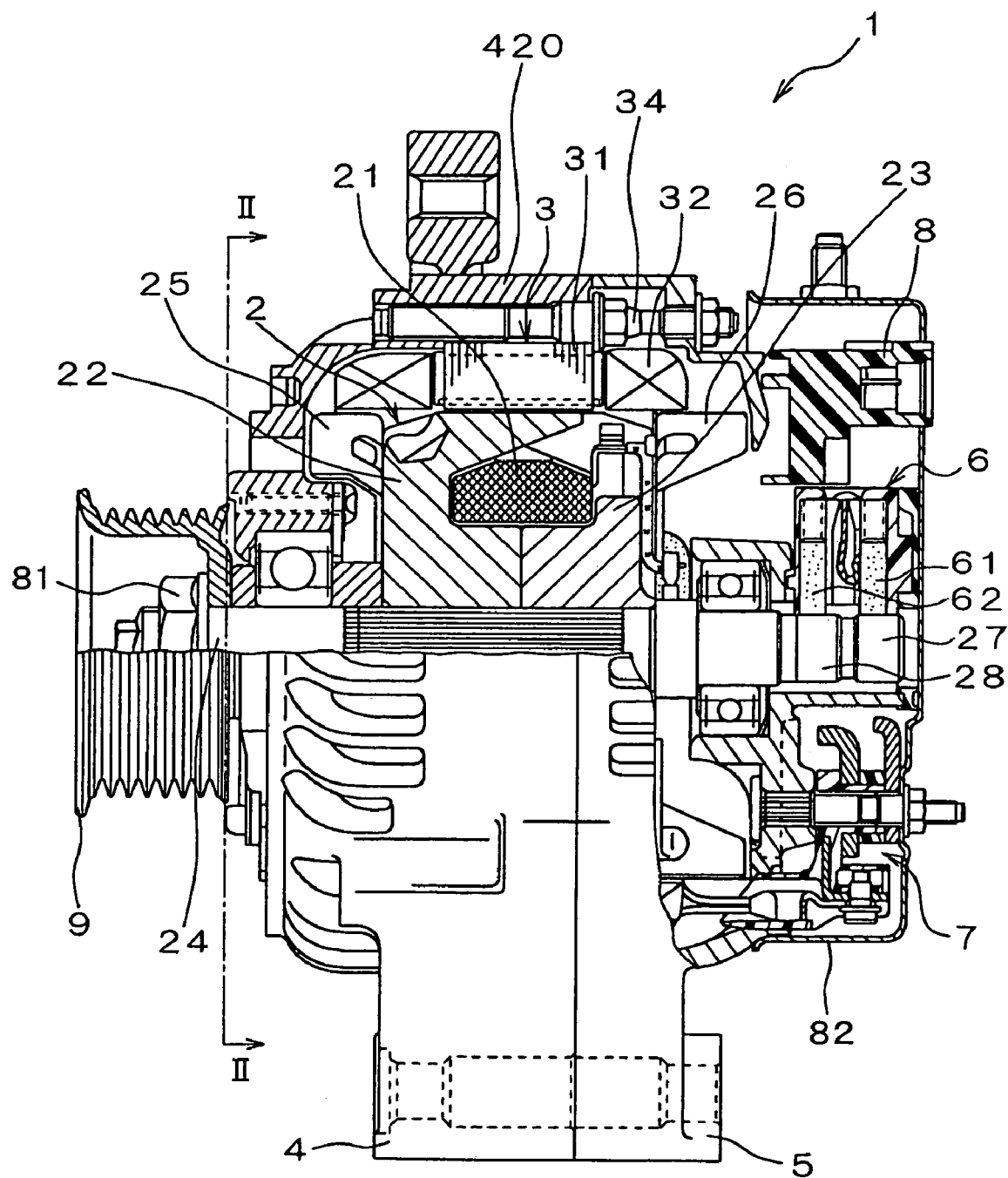
FIG. 1 is a cross-sectional view showing an entire structure of an alternator according to the present invention.

A preferred embodiment of the present invention will be described with reference to accompanying drawings. As shown in FIG. 1, an alternator 1 is composed of a rotor 2, a stator 3, a frame formed by a front frame 4 and a rear frame 5, a brush device 6, a rectifier 7, a voltage regulator 8, a pulley 9 and other associated components. The pulley 9 is positioned at a front side of the alternator 1, while components such as the brush device 6 are positioned at a rear side of the alternator 1. The front side and the rear side are indicated in FIG. 1 with an arrow.

The rotor 2 includes a pair of rotor cores 22, 23 firmly connected to a rotor shaft 24 and a rotor winding 21 wound on the rotor cores 22, 23. Each rotor core 22, 23 has a boss connected to the rotor shaft 24 and six claw-shaped poles. A cooling fan 25 for sucking cooling air in the axial direction and blowing the sucked cooling air in axial and radial directions is connected to a front surface of the front rotor core 22. Another cooling fan 26 (a centrifugal fan) for sucking cooling air in the axial direction and blowing the sucked cooling air in the radial direction is connected to a rear surface of the rear rotor core 23. The cooling fans 25, 26 are connected to respective rotor cores 22, 23 by welding or the like.

A pair of slip-rings 27, 28 are formed at the rear end of the rotor shaft 24, and brushes 61, 62 held in the brush device 6 slidably contact the slip-rings 27, 28. Excitation current is supplied to the rotor winding 21 from the rectifier 7 through the brushes 61, 62 and the slip-rings 27, 28.

The stator 3 is composed of a cylindrical stator core 31 and stator winding 32 disposed in slots formed in the stator core 31. The stator winding 32 forms a three-phase armature winding. The rectifier 7 rectifies three-phase alternating current generated in the stator winding 32 into a direct current output.

The rectifier 7 is composed of heat-sink plates and rectifier elements mounted on and soldered to the heat-sink plates.

The frame composed of the front frame 4 and the rear frame 5 contains therein the stator 3 and the rotor 2. The stator 3 is fixedly contained in the frame, and the rotor 2 is rotatably supported in the frame inside the stator 3. The stator 3 is sandwiched between the front frame 4 and the rear frame 5, and both frames 4, 5 are connected to each other with bolts 34 inserted into four supporting portions 420 formed at equal intervals around the outer periphery of the frames 4, 5.

The voltage regulator 8 controls the output voltage, which otherwise changes according to rotational speed and loads of the alternator 1, to a substantially constant level. The pulley 9 is connected to the front end of the rotor shaft 24 with nut 81, and the rotor 2 is driven by an engine via a driving belt coupling the engine to the pulley 9. The brush device 6, the rectifier 7 and the voltage regulator 8 mounted on the rear side of the rear frame 5 is covered with a rear cover 82.

Figure 2:
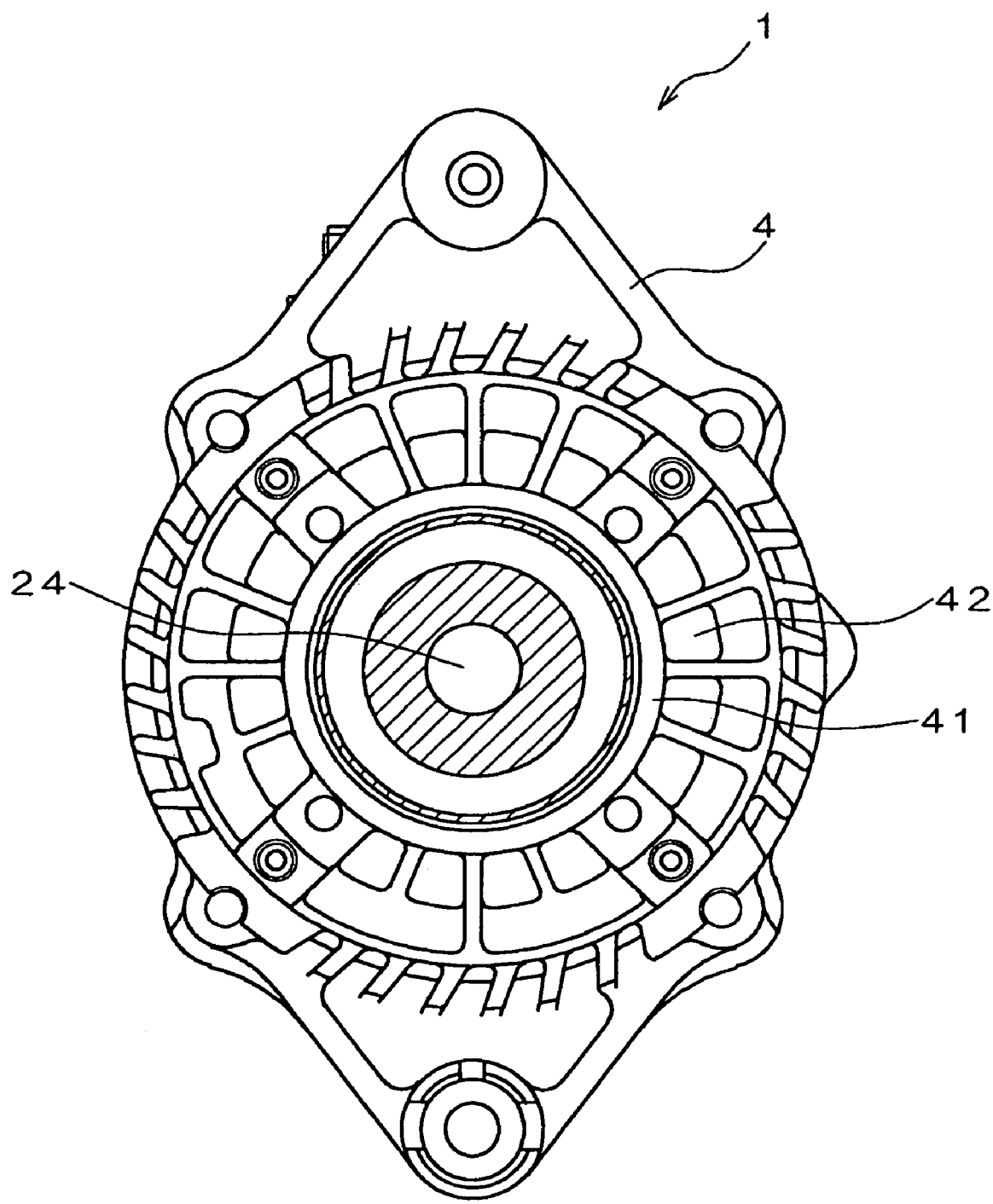
FIG. 2 is a plan view showing the alternator, viewed form direction II shown in FIG. 1.

Now, a structure of the pulley 9 and the front end of the front frame 4 will be described in detail with reference to FIGS. 2 and 3. The front flame 4 includes a bearing holder 400 in which a bearing 36 is contained. A collar 29 is sandwiched between the rear end surface of the pulley 9 and an inner ring of the bearing 36, and the pulley 9 is firmly connected to the rotor shaft 24 by fastening the nut 81.

The pulley 9 is made of a steel plate, for example, by stamping. The cylindrically shaped pulley 9 includes plural pulley grooves 91, a first flange 92 formed at the front end and a second flange 93 formed at the rear end of the pulley 9. The outer diameter ΦB of the second flange 93 is lager than the outer diameter of the pulley grooves 91 and smaller than the outer diameter ΦA of the first flange 92. Plural projections formed on the inside surface of the driving belt 100 engage with the plural grooves 91. The width of the driving belt 100 is correctly positioned between the first flange 92 and the second flange 93, guided by both flanges 92, 93.

A projected portion 41 is circularly formed on the front end of the front frame 4 and positioned outside of the second flange 93. A gap L1 between the outer diameter ΦB of the second flange 93 and the inner diameter of the projected portion 41 is made smaller than a thickness (in the radial direction) of the driving belt 100. It is preferable to make the gap L1 considerably smaller than the thickness of the driving belt 100, taking into consideration that the driving belt 100 is made of a material having a certain resiliency. For example, the gap L1 is made smaller than 3 mm. Windows 42 for introducing cooling air into the frame are made at a radial outside of the projected portion 41.

Figure 3:
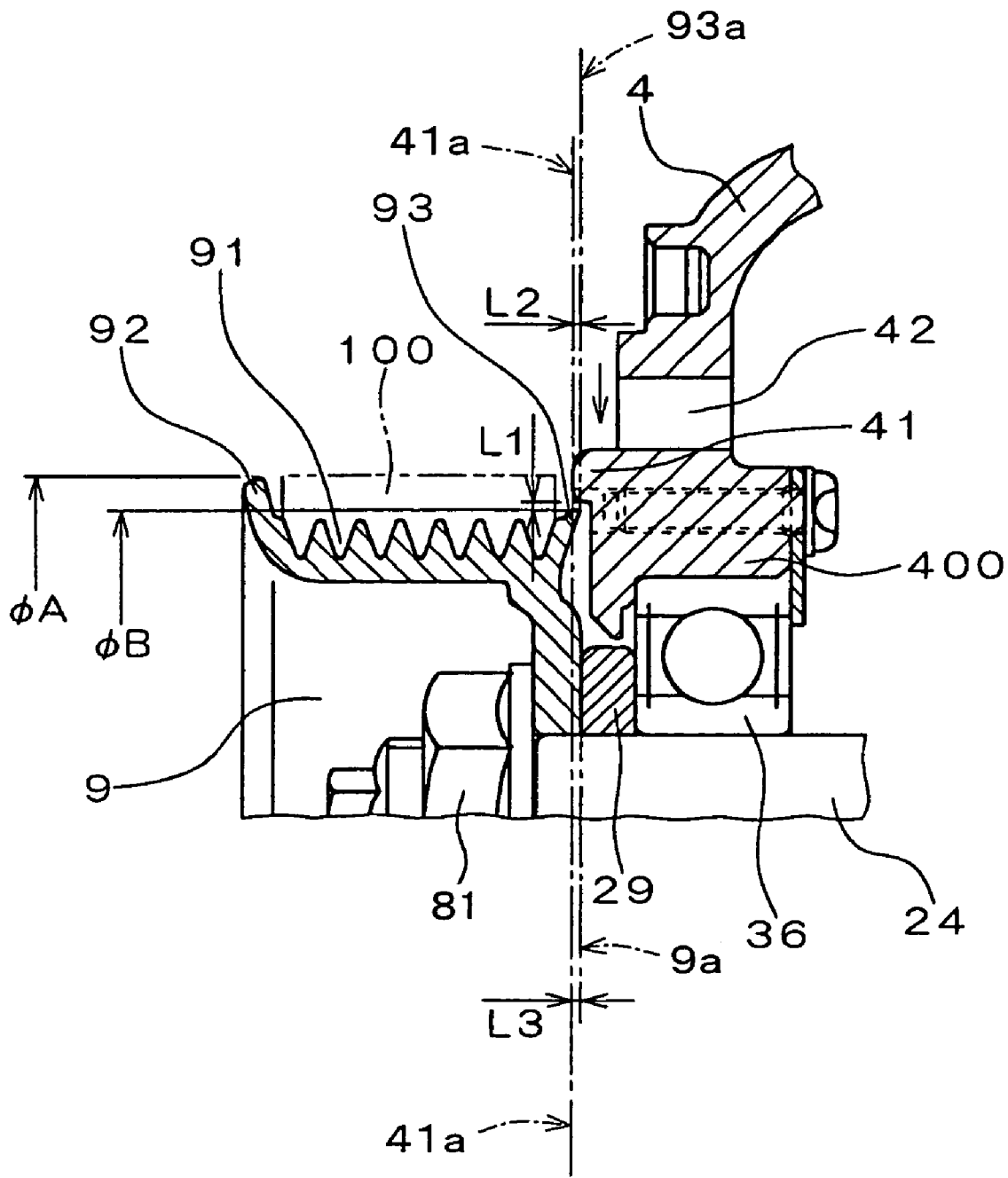
FIG. 3 is a partial cross-sectional view showing a rear end frame and a pulley used in the alternator, in an enlarged scale.

As shown in FIG. 3, the front end surface 41a of the projected portion 41 is positioned at a front side of the rear end surface 93a of the second flange 93. In other words, there is a small overlap L2 in the axial direction between the rear end surface 93a of the second flange 93 and the front end surface 41a of the projected portion 41. The rear end surface 9a of the pulley 9 is positioned at a rear side of the front end surface 41a of the projected portion 41. In other words, there is a small overlap L3 in the axial direction between the rear end surface 9a of the pulley 9 and the front end surface 41a of the projected portion 41.

The outer diameter ΦB of second flange 93 is smaller than the outer diameter ΦA of the first flange 92. Therefore, when the driving belt 100 is coupled to the pulley 9, the driving belt 100 may not be properly guided by the second flange 93 and may shift toward the front frame 4. If this happens, the rear side of the driving belt 100 contacts the front surface 41a of the projected portion 41 and is properly guided to a correct position. The gap L1 is smaller than the thickness of the driving belt 100, and there is the overlap L2 between the rear end surface 93a of the second flange 93 and the front end surface 41a of the projected portion 41. Therefore, the side of the driving belt 100 surely interferes with the front end surface 41a of the projected portion 41 if the driving belt 100 shifts toward the front frame 4 when coupling the driving belt 100 to the pulley 9. In this manner, the driving belt 100 is always correctly positioned between the first flange 92 and the second flange 93.

Since there is the overlap L3 between the front end surface 41a of the projected portion 41 and the rear end surface 9a of the pulley 9, water is prevented from easily entering into the bearing 36 when the alternator 1 is mounted on an automobile so that the rotor shaft 24 becomes parallel to the horizontal direction. Thus, an amount of water entering into the bearing 36 is reduced. Since the projected portion 41 is formed at a radial inside of the cooling air sucking windows 42, the projected portion 41 does not interfere with a cooling airflow entering into the windows 42, rather the cooling airflow is properly guided by the projected portion 41.

The present invention is not limited to the embodiment described above, but it may be variously modified. For example, the pulley 9 may be made by machining or forging though it is explained that the pulley 9 is made of a steel plate by stamping in the above embodiment. While the present invention has been shown and described with reference to the foregoing preferred embodiment, it will be apparent to those skilled in the art that changes in form and detail may be made therein without departing from the scope of the invention as defined in the appended claims.

What is claimed is:

1. An alternator for use in an automotive vehicle, the alternator comprising:

a frame;

a rotor having a rotor shaft rotatably supported in the frame; and a pulley for driving the rotor, the pulley being connected to the rotor shaft and positioned outside the frame, wherein:

the pulley includes pulley grooves for engaging with projections of a driving belt, a first flange formed at a front end of the pulley, and a second flange formed at a rear end of the pulley, the second flange having a diameter larger than an outer diameter of the pulley grooves and smaller than a diameter of the first flange;

the frame includes a projected portion circularly formed on a front end of the frame, the projected portion being positioned radially outside of the second flange and forming a gap between the diameter of the second flange and a radial inside of the projected portion;

a collar is disposed on a rear end surface of the pulley in close contact therewith, and an outer diameter of the collar faces an inner periphery of the frame, forming a second gap; and a size of the gap and a size of the second gap are substantially equal, and an axial gap between the frame and the pulley positioned between the gap and the second gap is wider than the size of the gap and the second gap.

2. The alternator as in claim 1, wherein:

the gap between the diameter of the second flange and the radial inside of the projected portion is smaller than a thickness of the driving belt.

3. The alternator as in claim 1, wherein:

a front end surface of the projected portion is positioned at a front side of a rear end of the second flange, thereby making an overlap therebetween.

4. The alternator as in claim 2, wherein:

a front end surface of the projected portion is positioned at a front side of a rear end of the second flange, thereby making an overlap therebetween.

5. The alternator as in claim 1, wherein:
a front end surface of the projected portion is positioned at a front side of the rear end surface of the pulley, thereby making an overlap therebetween.

6. The alternator as in claim 4, wherein:
a front end surface of the projected portion is positioned at a front side of the rear end surface of the pulley, thereby making another overlap therebetween.

7. The alternator as in claim 1, wherein:

the frame includes windows for sucking cooling air into the frame when the rotor rotates, the windows being positioned radially outside of the projected portion.

\* \* \* \* \*